March 9, 1926.                                                1,575,699
R. MANCHA
ELECTRIC STORAGE BATTERY LOCOMOTIVE
Filed April 14, 1924     2 Sheets-Sheet 1
Fig. 1.
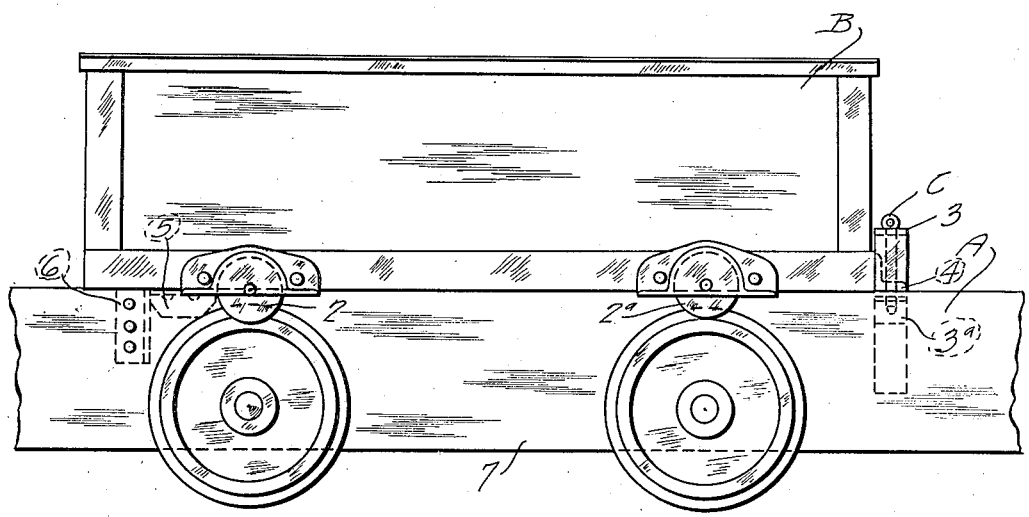
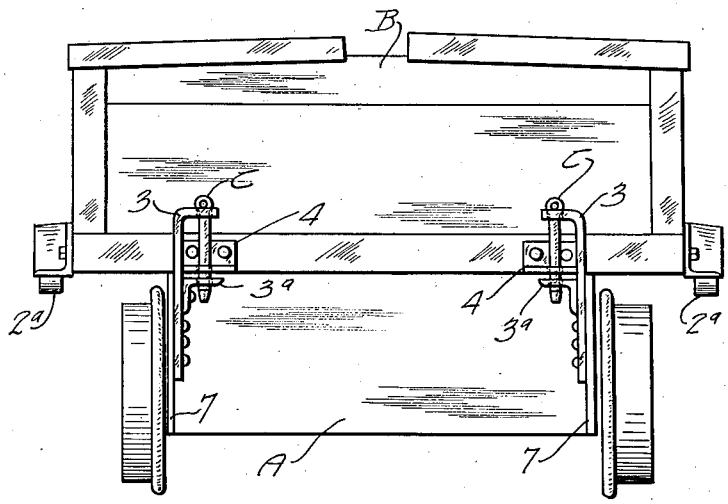
Fig. 2.
INVENTOR
Raymond Mancha.
By Bakewell & Church
ATTORNEYS March 9, 1926.
R. MANCHA
1,575,699
ELECTRIC STORAGE BATTERY LOCOMOTIVE
Filed April 14, 1924    2 Sheets-Sheet 2
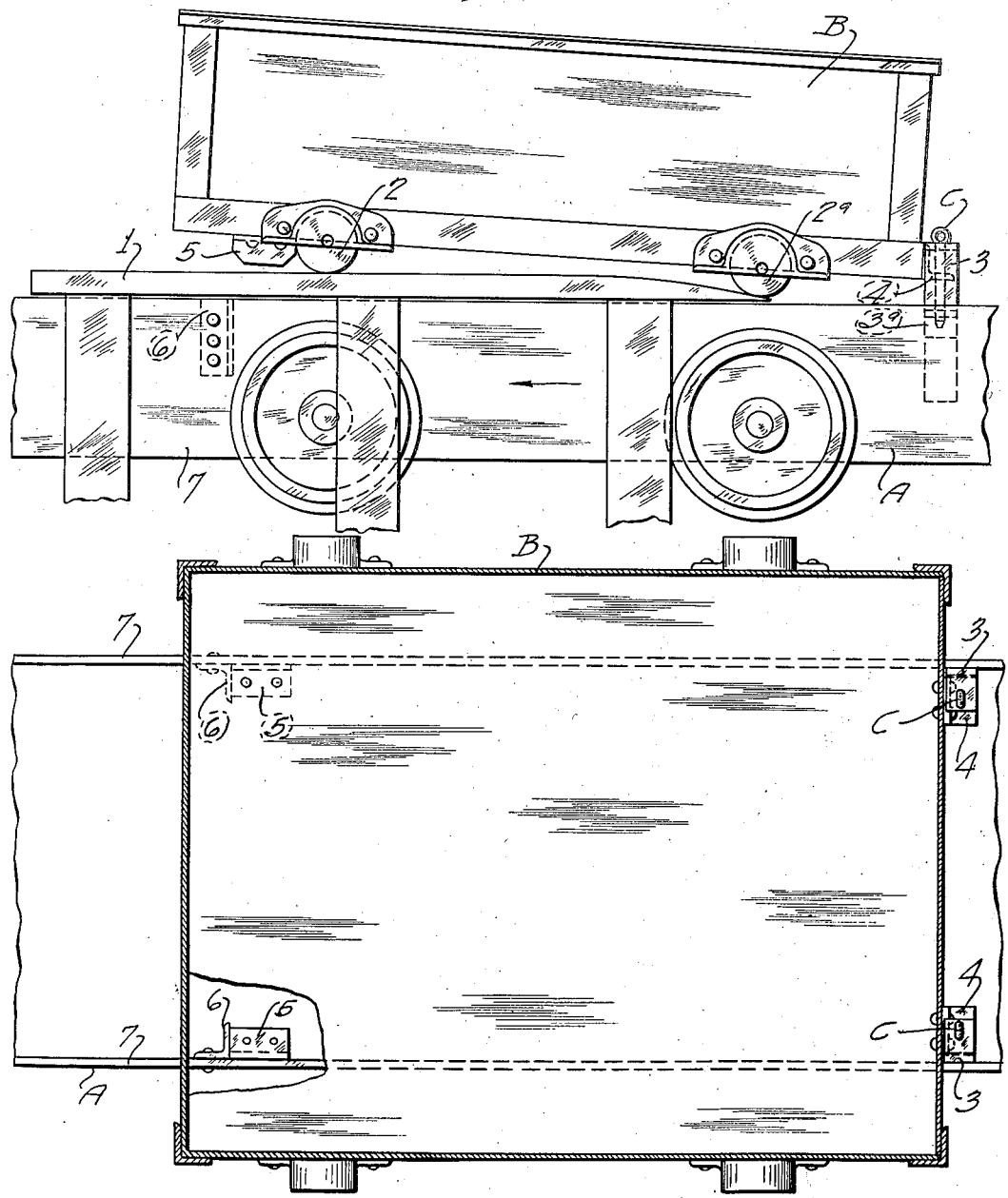
INVENTOR
Raymond Mancha.
By Bakewell & Church
ATTORNEYS Patented Mar. 9, 1926.

1,575,699

UNITED STATES PATENT OFFICE.

RAYMOND MANCHA, OF ST. LOUIS, MISSOURI, ASSIGNOR TO MANCHA STORAGE BATTERY LOCOMOTIVE COMPANY, OF ST. LOUIS, MISSOURI, A CORPORATION OF DELAWARE.

ELECTRIC STORAGE-BATTERY LOCOMOTIVE.

Application filed April 14, 1924. Serial No. 706,432.

*To all whom it may concern:*

Be it known that I, RAYMOND MANCHA, a citizen of the United States, residing at St. Louis, Missouri, have invented a certain new and useful Improvement in Electric Storage-Battery Locomotives, of which the following is a full, clear, and exact description, such as will enable others skilled in the art to which it appertains to make and use the same.

This invention relates to electric storage battery locomotives of the type in which the storage batteries are contained in a box that is mounted on the chassis of the locomotive in such a manner that it can be removed bodily from the chassis and placed on a supporting structure on which it is sustained during the operation of re-charging the batteries therein. One method that is now being used for effecting the transfer of the battery box of an electric storage battery locomotive from the chassis onto the supporting structure on which the battery box is sustained during the re-charging operation, consists in moving the locomotive into proximity to a supporting structure provided with two spaced, elevated rails or supporting members that are inclined slightly or provided with inclined ends, causing laterally-projecting devices at the sides of the battery box to engage said rails and then continuing the movement of the chassis so as to push the battery box longitudinally of said rails, the inclination of the rails or the inclined portions of the rails causing the battery box to be raised from the chassis and deposited on said rails. Thereafter, when the battery box is to be re-mounted on the chassis, the chassis is moved to a point directly underneath the battery box sustained by the rails of the supporting structure, said battery box is coupled with the chassis and the chassis is then moved in the reverse direction so as to pull the battery box longitudinally of said rails and cause said battery box to move downwardly from the rails onto the chassis, as the chassis moves away from the supporting structure.

One object of my present invention is to provide an electric storage battery locomotive in which the coupling means that connects the battery box with the chassis can be operated quickly and easily to couple or uncouple said elements and is of such construction that it permits of a relatively great vertical movement of the battery box relatively to the chassis during the operation of dismounting or mounting the battery box.

Another object is to provide an electric storage battery locomotive in which the means that is used for holding the battery box in operative position on the chassis is inexpensive to manufacture and of such design that the battery box will be held rigidly against movement either longitudinally or transversely of the chassis, notwithstanding the fact that the battery box is free to move vertically relatively to the chassis in the operation of transferring the battery box from the chassis onto a supporting structure, or vice versa.

Figure 1 of the drawings is a side elevational view of an electric storage battery locomotive constructed in accordance with my invention, showing the battery box arranged in operative position on the chassis.

Figure 2 is an end elevational view, showing the coupling devices arranged at one end of the battery box.

Figure 3 is a side elevational view of my improved locomotive, illustrating the operation of transferring the battery box from the chassis onto a supporting structure, or vice versa; and Figure 4 is a horizontal sectional view of the battery box, illustrating the co-operating devices on the battery box and on the chassis that hold the battery box rigidly in operative position on the chassis.

Referring to the drawings which illustrate the preferred form of my invention, A designates the chassis of an electric storage battery locomotive, which chassis may be of any preferred construction, and B designates a battery box mounted on said chassis in such a manner that it can be transferred from the chassis onto a supporting structure provided with a pair of spaced, elevated rails 1 by moving the locomotive into a position in proximity to said supporting structure so as to cause laterally-projecting devices 2 at one end of the battery box to ride up onto the rails 1, and then continuing the movement of the chassis in the direction indicated by the arrow in Figure 3 so as to cause laterally-projecting devices 2ª at the opposite end of the battery box to ride up onto the rails 1, thereby effecting the trans-

fer of the battery box from the chassis onto the rails 1 of the supporting structure and permitting the chassis to be moved into proximity to another supporting structure that sustains a battery box containing charged batteries.

In an electric storage battery locomotive of the kind referred to it is essential:

(1st) That the battery box be mounted on the chassis in such a manner that it cannot shift longitudinally or transversely of the chassis when the locomotive is in use;

(2nd) That the battery box and chassis be coupled together in such a way that the battery box can move vertically relatively to the chassis, during the operation of transferring the battery from the chassis onto the supporting structure, or vice versa, without completely breaking the connection between the battery box and the chassis; and (3rd) That the coupling means between the chassis and battery box be of such a nature that the operator in charge of the locomotive can quickly uncouple the chassis from the battery box after the box has been transferred onto the supporting structure and quickly couple the battery box with the chassis preparatory to transferring said box from the supporting structure onto the chassis.

To this end I have equipped the locomotive with one or with a plurality of coupling pins C, each of which is adapted to be inserted through two co-operating lugs or brackets 3 and 3ª on the chassis and a lug or bracket 4 on the battery box that is arranged between and in vertical alignment with the lugs 3 and 3ª on the chassis, the lugs 3 and 3ª being spaced far enough apart and the pins C being long enough to permit the battery box to move vertically high enough to clear the chassis during the operation of transferring the battery box onto the rails 1 of the supporting structure. The battery box is provided at its opposite end with one or more depending devices 5 that are adapted to co-operate with a stop or stops 6 on the chassis A so as to rigidly hold this end of the battery box against movement either transversely or longitudinally of the chassis. In the form of my invention herein illustrated the battery box B is provided at one end with two horizontally-disposed brackets 4, each of which is positioned between a pair of vertically-aligned lugs or brackets 3 and 3ª on the chassis, when the battery box is arranged in operative position on the chassis, and two coupling pins C are provided for co-operation with said lugs or brackets, as shown in Figure 2. At the opposite end of the battery box two devices 5 project downwardly from the underside of same at such points that they will bear against the side frames 7 of the chassis and against stops 6 on said side frames, as shown in Figure 4. Due to the fact that the devices 5 on the battery box are arranged between the side frames of the chassis, said devices effectively hold one end of the battery box from movement transversely of the chassis, and said devices 5 also co-operating with the stops 6 on the chassis to prevent the battery box from moving longitudinally of the chassis in one direction. Movement of the battery box longitudinally of the chassis in the opposite direction is prevented by the brackets 4 on the battery box through which the coupling pins C pass and said brackets and coupling pins also co-operate with each other to prevent the battery box from moving transversely of the chassis. The laterally-projecting devices 2 and 2ª on the battery box that co-operate with the rails 1 of the supporting structure may be of various forms, but I prefer to mount rollers 2 and 2ª on the sides of the battery box adjacent the opposite ends of same so as to facilitate the movement of the battery box longitudinally of the supporting structure during the operation of dismounting or mounting the battery box.

When the locomotive is in use the co-operating devices 6 and 5 on the chassis and on one end of the battery box and the brackets 4 at the opposite end of the battery box and the coupling pins C on the chassis that project through said brackets, hold the battery box in rigid relation with the chassis. During the operation of transferring the battery box from the chassis onto the supporting structure the depending devices 5 on the battery box move automatically out of engagement with the stops 6 on the side frames of the chassis, and after said parts have been disengaged, the movement of the chassis is transmitted to the battery box by the coupling pins C on the chassis that project through the brackets 4 on the battery box. Due to the fact that the pins C are relatively long and the brackets 3 on the chassis are located a considerable distance above the brackets 3ª on the chassis, the brackets 4 can travel upwardly on the pins C high enough to cause the battery box to clear the chassis without completely breaking the connection between the battery box and the chassis. After the battery box has been deposited on the supporting structure the coupling pins C are withdrawn from the vertically-aligned lugs or brackets on the chassis and battery box in which said pins are normally arranged, thus permitting the chassis to be moved away from the supporting structure. When it is desired to transfer the battery box from the supporting structure onto the chassis the chassis is moved to a position directly underneath the battery box, the coupling pins C are inserted in the vertically-aligned brackets 3, 3ª and 4, and the chassis is then moved in the opposite direction away from the supporting structure, thereby causing the battery box to be pulled longitudinally of the rails 1 of the supporting structure and gradually lowered onto the chassis in such a way that the devices 5 on the battery box move automatically into engagement with the stops 6 on the chassis.

While I have herein illustrated my invention embodied in a locomotive in which the means on the chassis that sustains the coupling pins C is composed of two pairs of vertically-aligned members on the chassis in which the coupling pins are disposed vertically, I wish it to be understood that it is immaterial, so far as my invention is concerned, what means is employed on the chassis to sustain the coupling pins. It is also immaterial whether one or two coupling pins are used, as my broad idea consists of an electric storage battery locomotive in which the battery box is maintained in operative position on the chassis when the locomotive is in use by co-operating devices on the chassis and on one end of the box that move automatically into and out of engagement with each other during the operation of mounting or dismounting the box, and a manually-operable coupling means at the opposite end of the box constructed so as to permit the battery box to move vertically relatively to the chassis and at the same time utilize the movement of the chassis relatively to the supporting structure to move the battery box over said supporting structure.

From the foregoing it will be seen that my invention insures the battery box of an electric storage battery locomotive being held securely in operative position on the chassis when the locomotive is in use; it makes it possible to utilize the movement of the chassis relatively to the supporting structure on which the battery box is sustained during the operation of re-charging the batteries therein, to effect the transfer of the battery box from the chassis onto the said supporting structure, or vice versa; and it enables the chassis of the locomotive to be quickly coupled to or uncoupled from the battery box.

Having thus described my invention, what I claim as new and desire to secure by Letters Patent is:

1. An electric storage battery locomotive, comprising a chassis, a battery box mounted on said chassis, and a device for coupling said box to said chassis consisting of vertically-aligned members on said box and chassis and a removable pin arranged in said members, said pin being long enough to permit said box to move vertically relatively to the chassis high enough to cause the chassis to clear a supporting structure on which the box is sustained.

2. An electric storage battery locomotive, comprising a chassis, a battery box mounted on said chassis, a coupling pin carried by one of said elements, and a member on the other element through which said coupling pin passes, said pin being of such length and said member being so arranged that the battery box can move vertically relatively to the chassis during the operation of transferring the box from the chassis onto a supporting structure, or vice versa, without breaking the connection between said member and pin.

3. An electric storage battery locomotive, comprising a chassis, a battery box mounted on said chassis, and a means for coupling said box to said chassis consisting of a perforated member on one end of the box, a pair of spaced perforated members on the chassis between which the member on the box is normally arranged, and a vertically-disposed removable pin mounted in said members.

4. An electric storage battery locomotive, comprising a chassis, a battery box mounted on said chassis, co-operating holding devices on the chassis and on one end of the box that move automatically into and out of engagement with each other during the operation of mounting and dismounting the box, and a manually-operable means at the other end of the box for coupling it to the chassis constructed so as to permit the box to move vertically relatively to the chassis while the box is moving over a supporting structure, due to the pressure exerted on same by the chassis.

5. An electric storage battery locomotive, comprising a chassis, a battery box removably mounted on said chassis, depending devices at one end of said box that are adapted to engage the side frames of the chassis so as to hold the box against transverse movement, stops on said side frames that co-operate with said devices to prevent longitudinal shifting of the battery box in one direction, and a coupling device at the opposite end of the box for holding the box against transverse movement.

RAYMOND MANCHA.